United States Patent [19]

Cusano et al.

[11] 4,242,221

[45] Dec. 30, 1980

[54] CERAMIC-LIKE SCINTILLATORS

[75] Inventors: Dominic A. Cusano; Fred F. Holub, both of Schenectady; Svante Prochazka, Ballston Lake, all of N.Y.

[73] Assignee: General Electric Company, Schenectady, N.Y.

[21] Appl. No.: 853,085

[22] Filed: Nov. 21, 1977

[51] Int. Cl.³ .......................................... C04B 35/50
[52] U.S. Cl. ........................... 252/301.4 H; 252/301.5; 264/56; 264/85; 264/325; 264/332
[58] Field of Search .................. 264/65, 332, 325, 85, 264/1, 85; 252/301.4 H, 301.5

[56] References Cited

U.S. PATENT DOCUMENTS

| | | | |
|---|---|---|---|
| 2,755,254 | 7/1956 | Butler | 264/65 |
| 3,402,293 | 9/1968 | Shambon | 252/301.4 H |
| 3,465,074 | 9/1969 | Neuroth | 264/1 |
| 3,469,976 | 9/1969 | Iler | 264/65 |
| 3,484,511 | 12/1969 | Delrieux | 264/332 |
| 3,562,371 | 9/1971 | Bush | 264/65 |
| 3,595,803 | 7/1971 | Dugger | 264/332 |

*Primary Examiner*—John A. Parrish
*Attorney, Agent, or Firm*—Alexander M. Gerasimow; Marvin Snyder; James C. Davis

[57] ABSTRACT

Scintillator bodies comprising fluorescent materials and having high optical translucency with low light absorption and methods of making the scintillator bodies are disclosed. In accordance with one embodiment of the invention, the scintillator bodies are formed by a hot-pressing process. In another embodiment, cold-pressing followed by sintering is employed. Another embodiment employs controlled cooling. Another embodiment employs hot-forging. The scintillator bodies that result are easily machined to desired shapes and sizes.

27 Claims, 4 Drawing Figures

CERAMIC-LIKE SCINTILLATORS

BACKGROUND OF THE INVENTION

This invention relates to scintillators and scintillating materials. More particularly, this invention relates to a method for producing ceramic-like scintillator bodies comprising pressed phosphors, the scintillator bodies having high optical translucency with low light absorption and a high degree of physical integrity, which properties render bodies highly useful in computerized tomography detectors.

In general, a scintillator is a material which emits electromagnetic radiation in the visible or near visible spectrum when stimulated by high energy electromagnetic photons such as those in the x-ray and gamma-ray regions of the spectrum. Thus, these materials are excellent choices for use as detectors in industrial or medical x-ray or gamma-ray equipment. In most typical applications, the output from scintillator materials is made to impinge upon photoelectrically responsive materials in order to produce an electrical output signal in direct relation to the intensity of the initial X-ray or gamma-ray bombardment.

In general, it is desirable that the amount of output from these scintillators be as large as possible for a given amount of X-ray or gamma-ray energy. This is particularly true in the medical tomography area where it is desired that the energy intensity of the X-ray be as small as possible to minimize any danger to the patient.

As used herein and in the appended claims, the term "light" refers to electromagnetic radiation in the visible or near visible region of the spectrum so as to encompass those wavelength radiations in the infrared or ultraviolet regions typically emitted by the phosphors of interest herein. The term "optical" is also defined herein to include both the visible and these near visible wavelengths.

A scintillator body, in order to be effective, must be a good converter of high energy radiation (that is, X-rays and gamma-rays). Moreover, the scintillator body, to be efficient, must be a good transmitter of the light energy that results from high energy bombardment. If it is not, and this light is absorbed in the material, the overall conversion efficiency suffers. Thus, higher energy ionizing radiation must be applied to the scintillator to get the same electrical output from the overall system. For a medical tomographic X-ray system, this means poor quantum detection efficiency and a lower signal-to-noise ratio.

It is very desirable to grow single crystals of certain scintillator materials, however, the ability to grow such large crystals of these scintillating phosphors by conventional methods is not presently available. Hence, many scintillator materials that are in current use either have a polycrystalline or a powdered structure.

Another important property that scintillator materials should possess is that of a short afterglow or persistence. This means that there should be a relatively short period of time between the termination of the high energy radiation excitation and the cessation of input from the scintillator. If this is not the case, there is a resultant blurring, in time, of the information-bearing signal. Furthermore, if rapid scanning is desired, the presence of the afterglow can severely limit the scan rate, thereby rendering the viewing of moving bodily organs difficult.

Typical scintillator phosphors which have been used include barium fluorochloride doped with a europium activator (BaFCl:Eu). Other phosphors include lanthanum oxybromide doped with terbium (LaOBr-Tb), cesium iodide doped with thalium (CsI-Tl), calcium tungstate ($CaWO_4$), and cadmium tungstate ($CdWO_4$). If these phosphors and others are used in the powdered or polycrystalline form, the internal light path becomes extremely long and tortured, resulting in unnecessary absorption of light signal output. Many phosphors are not producible as single crystals which would have a greatly reduced amount of light absorption. In particular, attempts to grow BaFCl:Eu in single crystal form result in a material which is multifaceted and self-delaminating, like sheet mica. Thus, in these materials it is primarily the surface regions which contribute significantly to the light signal output resulting from high energy excitation.

Scintillator materials comprise a major portion of those devices used to detect the presence and intensity of incident high energy photons. Another commonly used detector is the high pressure noble gas ionization device. This other form of high energy photon detector typically contains a gas, such as xenon, at a high pressure (density), which ionizes to a certain extent when subjected to high energy X-ray or gamma-ray radiation. This ionization causes a certain amount of current to flow between the cathodes and the anodes of these detectors which are kept at a relatively high and opposite polarity from one another. The current that flows is sensed by some form of current-sensing circuit whose output is reflective of the intensity of the high energy radiation. Since this other form of detector operates on an ionization principle, after the termination of the irradiating energy, there still persists the possibility that a given ionization path remains open. Hence, these detectors are particularly characterized by their own form of "afterglow" which results in the blurring, in the time dimension, of the information contained in the irradiating signal.

Scintillation type detectors have several advantages over ionization type detectors used in tomographic applications. First, they do not require the maintenance of a gas at a high pressure (typically 25 atmospheres). Second, they are lower in cost. Third, they are easier to maintain. Fourth, they do not suffer from charge accumulation effects. Fifth, they are rigid and not sensitive to vibrational or microphonic noise sources as are the ionization detectors. Sixth, they are extremely rugged. Seventh, they do not require high voltages. Eighth, they can be easily coupled with photodiodes to form an entirely solid state device.

SUMMARY OF THE INVENTION

In accordance with one embodiment of the present invention, a suitable phosphor powder is subjected to a very high pressure at an elevated temperature, hereinafter referred to as hot-pressing. Hot-pressing of the phosphor powder produces a ceramic-like material which is particularly useful as a scintillator, exhibiting high optical translucency and low light absorption. These scintillator bodies are also characterized as having a fine-grained, polycrystalline structure with the theoretical packing density of the material, In addition, they also possess the physical integrity to withstand machining, lapping, and polishing. The resultant scintillator bodies are therefore useful in tomography detector arrays for a stationary detector tomography configuration. Their machinability also makes their production in small sizes possible, so that they are also usable in a high resolution rotating detector tomography configuration.

In another embodiment of the present invention, the hot-pressing of the scintillator phosphor occurs in an inert atmosphere, such a helium or argon, rather than in air which when trapped within the pressed material in residual pores, undesirably scatters the emitted light, thus producing greater inernal absorption and loss of optical output.

Several preferred methods are described for producing the scintillator material disclosed herein. One method, for example, hot presses the scintillator phosphor in an air ambient. Another method hot-presses the scintillator powder in an argon or helium ambient. Another method comprises heating the phosphor material following cold pressing. Another method comprises controllably cooling the melted phosphor. Still another method comprises hot-forging a sintered slug of phosphor material.

Accordingly, it is an object of this invention to provide scintillator bodies with a high optical translucency and low light absorption while still possessing sufficient physical integrity to withstand machining operations.

It is a further object of this invention to provide methods for the production of scintillator bodies with the foregoing characteristics.

DETAILED DESCRIPTION OF THE INVENTION

Figure 1:
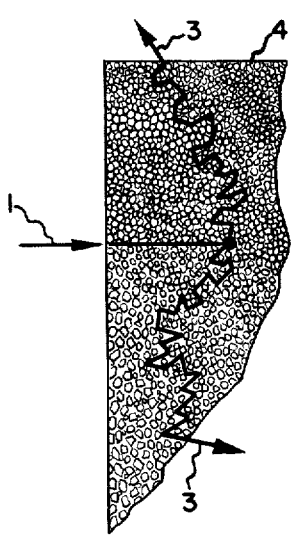
FIG. 1 is an illustrative cross-sectional view through scintillator material in the prior art form of polycrystalline or powder phosphors showing the effect of an incident high energy photon and resultant typical optical paths.

FIG. 1 shows a cross-sectional view through a body 4 of scintillator material comprising polycrystalline or powdered phosphors. FIG. 1 is illustrative of prior art and in particular of the problem of detecting light generated within the body of the scintillator. Here a high energy photon 1 carrying energy in the X-ray, or even gamma-ray, region of the spectrum, impinges upon a small internal crystalline grain of scintillator phosphor, such as BaFCl:Eu. The absorption of this single high energy photon 1 results in the production of many lower energy photons in the visible region of the spectrum. Because of the presence of many reflecting surfaces of the crystalline or other interstitial matter within the scintillator body 4, the resultant optical light path through the material is long, tortuous and dissipative of the light energy. Typical light paths 3 are shown in FIG. 1. Because the index of refraction of the polycrystalline or powdered fragment is different from that of the entrapped air or other interstitial matter, some of the light energy is transmitted through the fragment and some light energy is reflected in another direction. A substantial fraction of energy is lost by absorption. This continued splitting and absorption of resultant light energy reduces the overall output intensity of the light produced by the scintillator. A reflective coating or enclosure may be provided so that light emanating from the scintillator can be directed to a suitable photoelectrically responsive device.

The object of the processes to be described below is to remove the causes of opacity in pressed and quenched phosphor materials and in particular in those phosphors possessing sufficiently high luminescent efficiency and short afterglow to render the phosphors useful in computerized tomographic imaging systems. There are four basic causes of opacity in such substances. First, residual porosity remaining after pressing tends to cause absorption but it is thought that with the high degree of compaction achieved that residual porosity contributes only approximately 5 to 10 percent to the opacity. Second, impurities contained in the raw phosphor material contribute to opacity but this source is readily controllable by purification and anticontaminant measures. Third, moisture trapped within the material between crystalline grain surfaces also contributes to opacity but again this source is easily controlled by initially heating the raw phosphor material in an evacuated vessel and by removing any evolved water vapor from the vessel by vacuum pumping. A fourth source of opacity is present in some but not all phosphor materials. This fourth source, when present, is the internal cleavage of the material along preferred crystalline grain boundaries. The larger the crystalline grains present, the more severe the internal cleavage tends to become. To a certain extent this cleavage is present in certain hot-pressed phosphors.

It is to be kept in mind that it is not the in-line light transmission capabilities that are critical in the scintillator bodies herein; but rather, it is the total transmission of light within the scintillator body. It is not critical that light passing through the scintillator body is dispersed as long as that light eventually finds its way to the exterior of the body for detection. The dispersion is important primarily in that it leads to a greater number of energy absorbing interactions.

Figure 2:
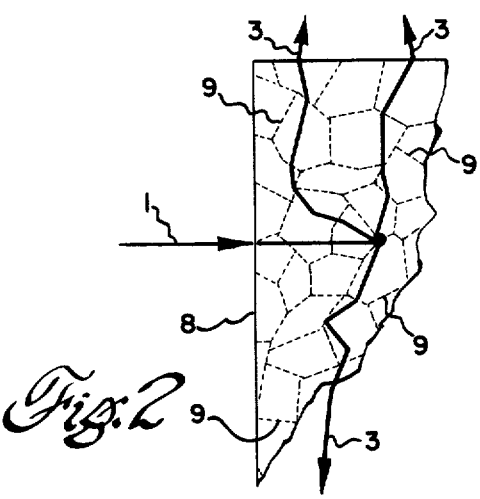
FIG. 2 is a cross-sectional view through scintillator material of the present invention also showing the effect of an incident high energy photon and resultant optical paths.

FIG. 2 is a cross-sectional view through a scintillator body 8 of the present invention. In a preferred embodiment of the present invention suitable phosphor material is pressed at an elevated temperature for a time sufficient to achieve compaction. The hot-pressing process produces desirable results in that the porosity of the material is greatly reduced and this important source of opacity is all but eliminated. There is a temperature-pressure trade-off permitted in that at higher pressures, the temperature may be higher. The temperature and pressure parameters are adjusted so that, for the particular phosphor being pressed, the melting point is not exceeded. The maximum pressure used in producing scintillator bodies in accordance with the hot pressing embodiment of the present invention was 725,000 pounds per square inch. Higher pressures are desirable to further limit the residual porosity but, at such high pressures, large volumed bodies of the phosphor material are difficult to produce. If desired, however, several smaller scintillator bodies may be assembled into a single scintillator detector element. The lowest pressure usable in producing scintillator bodies in accordance with the hot-pressing process is approximately 5,000 pounds per square inch.

In one preferred embodiment of this invention, suitable phosphor material, for example BaFCl:Eu (from which moisture has been removed by vacuum heating as described above) is pressed in an air ambient at a pressure of approximately 725,000 pounds per square inch and a temperature of 650° C. for approximately one and one-half hours using a boron nitride lined pressure cell such as that used for diamond synthesis. In another preferred embodiment of the present invention, BaFCl:Eu is pressed in an argon or helium atmosphere at a pressure of about 6,000 pounds per square inch and at temperatures from approximately 725° C. to approximately 1,010° C. for approximately one and one-half hours using a graphite die lined with platinum foil. In this latter embodiment, the scintillator material has a grain size depending on the selected hot-pressing temperature, the grain size being substantially larger than obtained under conditions of very high pressure. Nonetheless, in both of these embodiments the BaFCl is doped with Eu to the extent of approximately 1 mole percent. When the starting phosphor is free of impurities which otherwise segregate to the grain boundaries and form light absorbing inclusions, the scintillator bodies of the above embodiments possess characteristics which are particularly desirable for use in computerized tomographic imaging systems.

As shown in FIG. 2 a typical light path 3 generated within the scintillator body 8 due to irradiation by an impinging high energy photon 1, is much less convoluted and tortured than is a typical light path 3 in FIG. 1. The achievable total light transmission is a function of a number of intrinsic optical properties of the material, particularly birefringence, the density of scattering centers such as residual pores and second phase inclusions. But with pure starting materials, a total transmission as high as 85 percent of that of a single crystal is obtained. In FIG. 2, the lack of strong reflection and scattering is indicated by the dashed line interfaces 9.

The scintillator material of the present invention provides for an escape of emitted light greater than 85 percent of that light that would escape a single crystal. This amount of light escape results in superior overall conversion efficiency from incident high energy radiation to electrical output when the scintillator bodies are placed in an adjacency relationship with a suitable photoelectrically responsive device. The superior translucency also enhances the signal-to-noise ratio in a tomographic imaging system. In addition, the scintillator bodies of the present invention are readily susceptible to standard machining operations, thus enabling relatively small individual scintillation detectors to be fabricated. Producibility in small sizes also enhances the resultant signal resolution when these devices are employed in a computerized tomographic imaging system.

Moreover, the high packing density of the scintillator material tends to make the resultant ceramic-like scintillator bodies extremely uniform. This characteristic of uniformity is especially desirable in medical tomographic systems where a high degree of accuracy is required. With the present invention, the accuracy is enhanced without a need for special compensating circuits which take account of variations from detector element to detector element.

The hot-pressed barium fluorochloride phosphor produces light in the blue to ultraviolet range with a peak light output at a wavelength of 3,850 Å. This wavelength is well within the range in which many photoelectrically responsive devices are capable of detection. However, certain photodiodes respond optimally to light emitted at or about wavelengths in the red-orange region. In those cases in which photoelectrically responsive devices are not available which are sensitive in the spectral region of the scintillator output, the scintillator body may be surrounded by a jacket containing a wavelength conversion phosphor which is excitable by the light in the spectral region of the scintillator output and which emits light in a different spectral region to which the photodiode device is more sensitive.

As mentioned above, it is desired that the scintillator material have a short afterglow. In particular, a phosphor such as BaFCl:Eu in a polycrystalline or powdered form as shown in FIG. 1, does have a sufficiently short afterglow to render it useful for computerized tomographic applications. More particularly, the light output of this phosphor decays to 0.1 percent of its peak value within 1 millisecond after termination of the high energy irradiation. For general computerized tomography applications, this decay to within 0.1 percent of peak value is required to occur within 5 milliseconds of irradiation shutoff and for computerized tomographic applications involving moving body organs, this reduction to within 0.1 percent of peak value is required to occur within 1 millisecond. The hot-pressed phosphor material of the two embodiments described above does possess the required short afterglow needed for tomographic imaging of moving bodily organs, such as the heart, lungs, or digestive tract. This desirable property is not affected by the hot-pressing process.

Moreover, the hot-pressing of the phosphor material produces a substance which is very easily machined and polished by current metallographic procedures. This feature enables the material to be shaped into pieces which are 1 millimeter or less in width. It also permits surface polishing to enhance the transmission of internally-generated light photons. The ability to produce 1 millimeter thick scintillators is useful in achieving the high resolution that is desired in certain tomographic imaging systems.

Because of the high pressure and temperatures employed, it is important that the die press material not react with the phosphor being pressed. Thus, the die material must be of a noncorrosive and nonreactive substance. In addition, it is useful to coat the die faces with a thin layer of platinum or other nonreactive metal to further reduce any reaction contamination. Suitable die materials include alumina, silicon carbide, and dies made of certain metals, such as molybdenum, tungsten, or nickel based alloys.

As mentioned above, residual pores and second phase inclusions of contaminating substances with different refractive indices from that of the basic substance results in light scattering and absorption. The effectiveness of such light scattering centers is a function of their average size. The smaller the average size, the more light is absorbed since their numeric density increases as the third power of the inverse of their average size. Thus, it is important to minimize the volume fraction of residual pores and inclusions and maximize their average size. Typically, an acceptable translucency is not obtained unless the sum of the volume fraction of the pores plus inclusions is less than 0.1 percent. Control of the average size of these scattering centers is achieved by controlling grain growth during the densification process. The residual pores and inclusions move along with the grain boundaries, coalesce, and gradually grow in size only if they stay at the grain boundaries and are not trapped within grains. Thus duration at the consolidation temperature is an important fabrication parameter in addition to temperature and pressure since it controls grain growth and consequently the average size of pores and inclusions.

Gas entrapment within disconnected pores is undesirable in that it hampers complete pore elimination. It is therefore desirable to use an atmosphere during the hot-pressing process consisting of a gas which diffuses rapidly through the solid at the consolidation temperatures and in addition which is inert with respect to the phosphor material. Argon and helium are two such acceptable inert gases. Moreover, helium has the desired diffusion speed, and is therefore preferable. However, oxygen, air, and nitrogen can also be used as the atmosphere for hot-pressing without substantially affecting consolidation but these atmospheres produce an undesirable increase in residual porosity as compared with helium.

The process of hot-pressing described above employs unidirectional high temperature compaction in a die press arrangement to produce dense, translucent, pore-free phosphors. Another method of hot pressing, known as hot isostatic pressing (hipping), encloses the material to be pressed in a vacuum tight metal envelope (a can) which is then placed in a chamber filled with a high pressure gas and then heat is applied to the envelope. In this hipping process, the phosphor powder is first cold-pressed, usually into the shape of a cylindrical slug or billet before it is enclosed in the metal can. The metal can is made of a ductile metal such as nickel or platinum so that pressure may be transmitted to the contents of the can uniformly in all directions. The can with the phosphor billet is thoroughly dried and evacuated after which the can is welded shut. The can with the phosphor billet is then placed in a hipping autoclave at the desired temperature and pressure. During this heating, the metal can serves as an impermeable membrane which transmits the gas pressure to the compacted powder thereby effecting an isostatic densification.

Dense polycrystalline phosphors are also produced by sintering. This process involves first cold-pressing the phosphor powder at relatively high pressures such as, for example, approximately 5,000 atmospheres. This cold-pressing can achieve a densification of the powder to approximately 90 percent of the density of a single crystal of the material. Because the cold-pressing does not occur at an elevated temperature, the problem of reactive contamination with either die press or an air ambient is reduced. Following the cold-pressing operation, the pressed powder is then heated to a temperature below its melting point, the preferable temperature being approximately 10 percent below the melting point as measured in °K. This heating further serves to densify the material. Typically, the cold-pressing process results in a densification to approximately 90 percent, as compared to the single crystal density, while the sintering step at a temperature near the melting point produces further densification to within 97 percent of the theoretical density of a single crystal. A further advantage of this cold-pressing followed by sintering is that the material can be pressed into a variety of shapes which are more difficult to achieve by the hot-pressing process. Since the sintering is at a temperature below the melting point, the shape of the cold-pressed material is retained. Nonetheless, well crystallized materials result, showing no degradation in luminescent efficiency and no prolongation of afterglow duration.

Another process for producing better densification and crystallization than is found in the powdered or polycrystalline materials is cooling from the melt. In this process, the phosphor is heated to just above its melting point (for example, to a temperature exceeding its melting point by 10 percent as measured in °K), after which it is slowly cooled to a temperature below its melting point. For example, BaFCl:Eu is heated to a temperature of approximately 1,050° C., which is somewhat above its melting point of approximately 1,020° C., after which it is slowly cooled to room temperature. This process also produces materials suitable for use as a scintillator possessing translucency, luminescent efficiency, and short afterglow.

Still another process for producing polycrystalline materials with increased tranlucency is hot-forging. In this process a billet or slug is first prepared by hot-pressing or by cold-pressing and sintering. The billet is then placed in an oversized hot-pressing die and inserted into a hot-pressing furnace. After the billet is brought to the desired temperature, the pressure is gradually increased to effect a plastic deformation and creep in the precompacted billet. The total strain is expressed by the relative change in the dimension of the body along the axis of pressing. A decrease of approximately 30 percent to 40 percent in this dimension is preferable.

The improvement in the translucency of the billet as a result of the deformation results from two phenomena. First, a great many new grain boundaries are generated within each original grain by a process called polygonization. These new grain boundaries promote the elimination of residual pores and the coalescence of inclusions, particularly those inclusions and pores trapped within grains which cannot be eliminated otherwise. Second, as a result of recrystallization of the new grains generated in the process of polygonization, a microscopic texture is developed in the material; that is, a higher degree of crystallographic orientation of the grains results. Such a structured orientation is particularly important for translucency in those materials with optical and mechanical anisotropies since it relieves internal stresses due to thermal expansion anisotropy and optical dispersion due to variations in the refractive index in different crystallographic directions.

Figure 3:
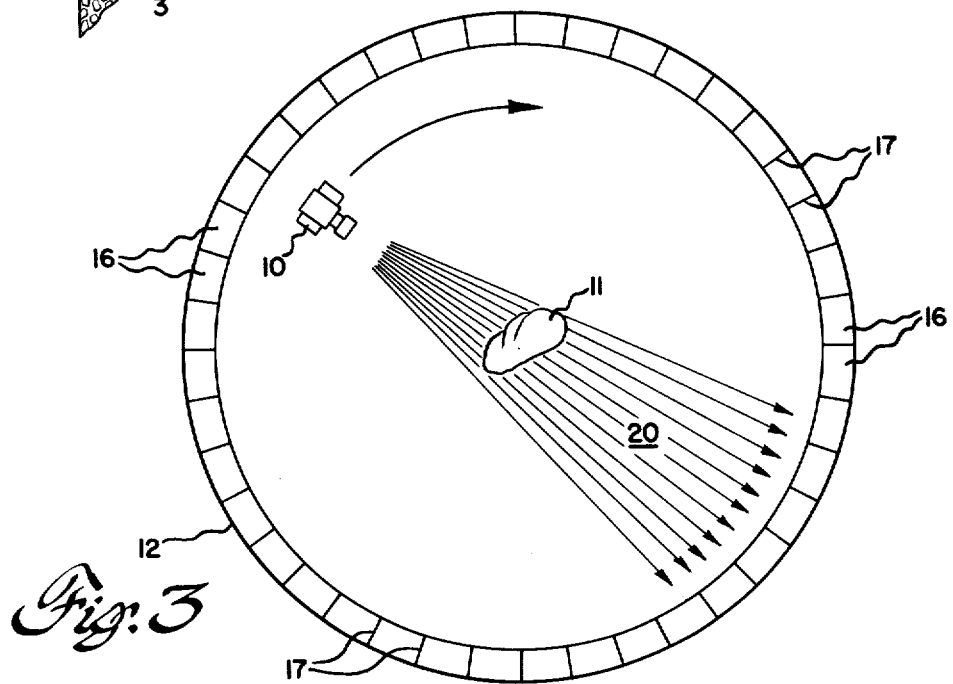
FIG. 3 is a plan view showing the scintillators of the present invention in use in a stationary detector computerized tomography imaging system.

FIG. 3 shows scintillator material 16 of the present construction configured for use in a detector array for a stationary computerized tomography imaging system. In this system, a rotating source of X-rays 10 is adapted to emit a substantially planar fan shaped beam of radiation 20 passing through the body 11 under examination. In this configuration, the array of scintillators 12 is stationary and the X-ray source 10 rotates about the body 11. The emitted beam of radiation 20, having passed through the subject body 11, impinges upon scintillation detectors 16 which are separated from one another by collimators 17, typically composed of a heavy metal substance such as tungsten. The resultant light emitted by the separated scintillators 16 is converted into an electrical signal through an appropriate photoelectrically responsive device (not shown), such as a photodiode. The resultant electrical signal outputs are analyzed by a high speed computer (also not shown) which generates a two-dimensional array of data representing the absorption coefficients for various locations within the body 11 within the plane of fan beam 20. These are then converted to visual form by means of an image display device, for examination by the radiologist or other trained medical personnel.

Figure 4:
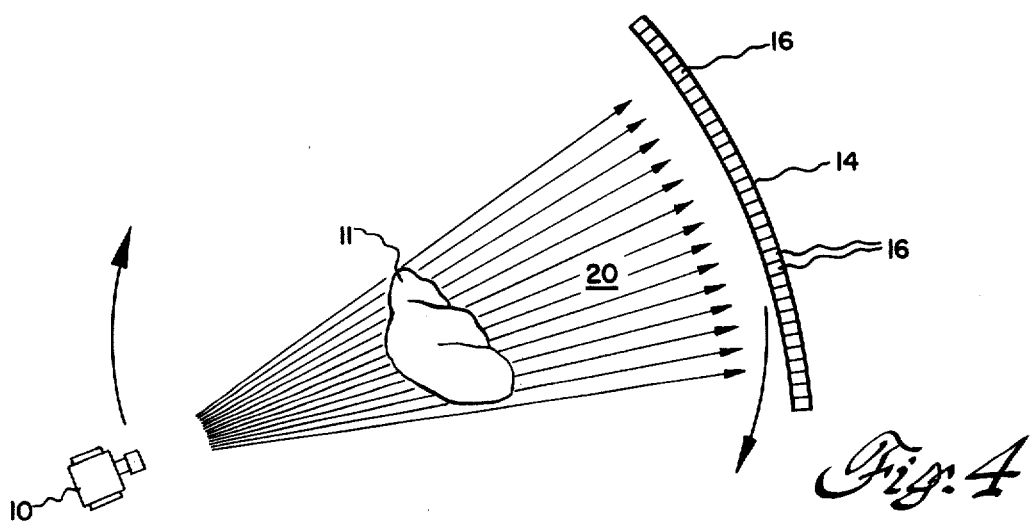
FIG. 4 is a plan view showing the scintillator materials of the present invention in use in a fan beam rotating detector computerized tomography imaging system.

FIG. 4 shows an array 14 of scintillators 16 of the present invention employed in a rotating detector computerized tomography imaging system. In this system, higher resolution scintillating devices are employed, and the devices employed are made to rotate in the same direction as the X-ray source 10 so that the fan beam of radiation 20 always irradiates the same scintillators. In this rotating configuration, the X-ray source 10 is usually pulsed during rotation so that the information produced by different amounts of absorption as the source 10 is rotated, is divided up in a time-wise fashion. In the rotating configuration, it is desirable that the spacings between adjacent scintillators and detectors be relatively small in order to provide the resolution desired. Since the devices of the present invention possess the physical integrity to withstand machining operations, high density spacing is easily achieved.

While this invention has been described with particular attention to BaFCl:Eu as a phosphor, other suitable phosphors subjected to the same processing produce usable scintillators. Examples of other suitable phosphors include lanthanum oxybromide doped with terbium, cesium iodide doped with thalium, cadmium tungstate, and calcium tungstate.

While the invention has been described in detail herein in accordance with certain preferred embodiments thereof, many modifications and changes therein may be effected by those skilled in the art. Accordingly, it is intended by the following claims to cover all such modifications and changes as fall within the true spirit and scope of the invention.

The invention claimed is:

1. A process for producing optically translucent scintillation detectors, said detector comprising phosphor material selected from the group consisting of BaFCl:Eu, LaOBr:Tb, CsI:Tl, CaWO$_4$, and CdWO$_4$; said process comprising the step of:
   pressing the phosphor material at a substantially high pressure and at an elevated temperature which is below the melting point of the phosphor and for a time sufficient to allow compaction whereby an optically translucent body is formed.

2. The process of claim 1 in which the substantially high pressure used is between approximately 5,000 pounds per square inch and approximately 725,000 pounds per square inch.

3. The process of claim 1 in which the phosphor selected is BaFCl:Eu and the pressing occurs at a pressure of approximately 725,000 pounds per square inch.

4. The process of claim 3 in which the pressing occurs at a temperature of approximately 650° C.

5. The process of claim 1 in which the phosphor selected is BaFCl:Eu and the pressing occurs at a pressure of approximately 6,000 pounds per square inch.

6. The process of claim 5 in which the pressing occurs at a temperature between approximately 725° C. and approximately 1,010° C.

7. The process of claim 1 in which the phosphor is pressed in an atmosphere inert with respect to the phosphor and in which the atmosphere is selected from the group consisting of air, nitrogen, oxygen, argon, and helium.

8. The process of claim 7 in which the inert atmosphere is helium.

9. The process of claim 1 in which the phosphor is pressed in a vacuum.

10. The process of claim 1 in which the heating temperature is approximately 10 percent below the melting point of the phosphor, said heating temperature being measured in °K.

11. The process of claim 1 in which a die press is used to press the phosphor, said die being of a non-reactive and noncorrosive material.

12. The process of claim 11 in which the die is of a material selected from the group consisting of boron nitride, graphite, silicon carbide, alumina, molybdenum, tungsten, and nickel alloy.

13. The process of claim 11 in which the die face is coated with platinum.

14. The process of claim 1 in which the pressing is isotropic.

15. The scintillator material produced in accordance with claim 1.

16. A process for producing an optically translucent scintillation detector, said detector comprising phosphor material selected from the group consisting of BaFCl:Eu, LaOBr:Tb, CsI:Tl, Ca WO$_4$, and CdWO$_4$, said process comprising the steps of:
   pressing said phosphor material at a substantially high pressure and at approximately room temperature; and then
   sintering the pressed phosphor at an elevated temperature which is below the melting point of the phosphor whereby an optically translucent body is formed.

17. The process of claim 16 in which the pressing step occurs at a pressure between approximately 5,000 pounds per square inch and approximately 725,000 pounds per square inch.

18. The process of claim 16 in which the phosphor is pressed in an atmosphere inert with respect to the phosphor and in which the atmosphere is selected from the group consisting of air, nitrogen, oxygen, argon, and helium.

19. The process of claim 18 in which the inert atmosphere is helium.

20. The process of claim 16 in which the phosphor is pressed in a vacuum.

21. The process of claim 16 in which the heating temperature is approximately 10 percent below the melting point of the phosphor, said heating temperature being measured in °K.

22. The process of claim 16 in which a die press is used to press the phosphor, said die being of a nonreactive and noncorrosive material.

23. The process of claim 22 in which the die is of a material selected from the group consisting of boron nitride, graphite, silicon carbide, alumina, molybdenum, tungsten, and nickel alloy.

24. The process of claim 22 in which the die face is coated with platinum.

25. The scintillator material produced in accordance with claim 16.

26. A process for producing an optically translucent scintillation detector, said detector comprising phosphor material, selected from the group consisting of BaFCl:Eu, LaOBr:Tb, CsI:Tl, CaWO$_4$, and CdWO$_4$, said process comprising the steps of:
   hot-pressing the phosphor material at a temperature which is below the melting point of the phosphor, and for a time sufficient to allow formation of a compact billet; and then
   hot-forging the billet at a temperature below the melting point of the phosphor for a time and to a final pressure sufficient to achieve a plastic deformation of the billet between approximately 30 percent and approximately 40 percent in the direction of pressing.

27. A process for producing a translucent scintillation detector from phosphor material, selected from the group consisting of BaFCl:Eu, LaOBr:Tb, CsI:Tl, $CaWO_4$, and $CdWO_4$ said process comprising the steps of:

pressing the phosphor material at a substantially high pressure and at approximately room temperature (20° C.);

sintering the pressed phosphor at an elevated temperature which is below the melting point of the phosphor, whereby a compact phosphor billet is formed; and then hot-forging the billet at a temperature below the melting point of the phosphor for a time and to a final pressure sufficient to achieve a plastic deformation of the billet between approximately 30 percent and approximately 40 percent in the direction of pressing, whereby the translucency of the billet is increased.

* * * * *